United States Patent [19]

Ailey, Jr.

[11] Patent Number: 4,791,726
[45] Date of Patent: Dec. 20, 1988

[54] FLUID OPERATED SHEARS

[75] Inventor: Harrison A. Ailey, Jr., Knox County, Tenn.

[73] Assignee: Acraloc Corporation, Oak Ridge, Tenn.

[21] Appl. No.: 104,845

[22] Filed: Oct. 5, 1987

[51] Int. Cl.⁴ .............................................. B26B 15/00
[52] U.S. Cl. ........................................ 30/228; 30/180
[58] Field of Search ............ 30/180, 228, 245, 272 R; 81/301

[56]  References Cited

U.S. PATENT DOCUMENTS 3,255,525  6/1966  Frenzel ................................. 30/180
3,373,490  3/1968  Lendaro ................................ 30/228
3,706,245  12/1972 Van Schaik ....................... 30/180 X

FOREIGN PATENT DOCUMENTS 722160  1/1955  United Kingdom ................... 30/180

Primary Examiner—E. R. Kazenske
Assistant Examiner—William Fridie, Jr.
Attorney, Agent, or Firm—Pitts and Brittian

[57]  ABSTRACT

A head-held, pressurized fluid operated, shears unit for use in the processing of poultry and the like. The shears unit has a body member having a weight and size for ready grasp by a user. One of the cutting blades is fixed in position, and the second blade is pivotally-mounted so as to move toward and away from the first blade to effect a cutting action. The motion of the pivotal blade is effected by connecting that blade, through a pivotal linkage, to a reciprocatable piston rod that extends from a forward end of the body member. This piston rod is fastened at a second end to a double-acting piston within a piston cylinder in the body member. A master valve operated by a lever for grasp by a user directs the pressurized fluid to one of two sides of the double-acting piston so as to effect moving of the piston and piston rod and thus opening or closing the pivotal blade with respect to the fixed blade. When the body member is fabricated from machinable plastic, the master valve includes a valve body received in a cavity within the body member with the valve stem moving within this valve body.

15 Claims, 4 Drawing Sheets

FLUID OPERATED SHEARS

DESCRIPTION

1. Technical Field

This invention relates generally to cutting devices in the form of shears, and more particularly to hydraulically or pneumatically operated shears for such operations as involved in the cutting of poultry, etc.

2. Background Art

In the commercial processing of poultry, plant operators utilize shears for the removal of excess fat, skin and for the severing of components into units for the packaging thereof. It is conventional practice to utilize for these operations an essentially conventional two-bladed shears unit that is operated by hand. Such a unit is shown and described in U.S. Pat. No. 3,078,503, issued to G. E. Webb on Feb. 26, 1963. Some of the severing steps require substantial force being applied to the shears. Such use results in loss of time, increases worker fatigue and can result in injury to the worker.

There have been power-operated shears developed for certain applications. One such shears unit is described in U.S. Pat. No. 2,751,682, issued to H. E. Stout on June 26, 1956, which involves use of a rotary shaft, driven by some external motor, which causes one blade to pivot relative to a fixed blade. The pivotal blade is continuously moved. Another continuously moving blade, relative to a fixed blade, is described in U.S. Pat. No. 3,478,426, issued to O. Greene on Nov. 18, 1969. This is driven by an internal electric motor. Still another powered shears unit, specifically for poultry, is described in U.S. Pat. No. 3,893,237, issued to D. E. Jahnke on July 8, 1975. In this patent there are a pair of pivoting shear blades actuated by a pneumatic piston and cylinder assembly which is operated by a trigger mechanism. The blades are actuated once each time the trigger is actuated.

Other cutting arts also require powered shears to overcome the strain on the shears operator and to improve safety.

Accordingly, it is one object of the present invention to provide cutting shears that are powered so as to reduce the exertion, and resultant fatigue, of an operator.

It is another object to provide hydraulically operated shears having one fixed blade and one movable blade.

It is also an object of the invention to provide a hydraulically operated shears wherein each cutting action is individually controlled by an operator.

A further object of the present invention is to provide a shears unit suitable for use in the poultry industry in the dissection and trimming of poultry prior to the packaging thereof.

Another object of the present invention is to provide a shears unit for the poultry industry that can be easily cleaned.

These and other objects of the present invention will become apparent upon a full consideration of the detailed description and the accompanying drawings.

DISCLOSURE OF THE INVENTION

In accordance with the present invention, there is provided a hydraulically-operated hand-held shears unit. An elongated body member is provided for convenient grasp by a user, this body having a pivotable lever for easy operation by fingers of the user's hand. A rearward portion of the body member is provided with means for connection to a hydraulic system, and a forward portion of the body is enlarged to limit forward travel of the user's hand. This forward end carries a fixed blade and a cooperating pivotal blade. The pivotal blade is operated by a piston-driver linkage, with actuation effected by hydraulic fluid as controlled by a master valve operated by the lever. A spring is incorporated in the master valve of the system to assure a return of the master valve to a retracted position when pressure on the lever is released.

BEST MODE FOR CARRYING OUT THE INVENTION

Figure 1:
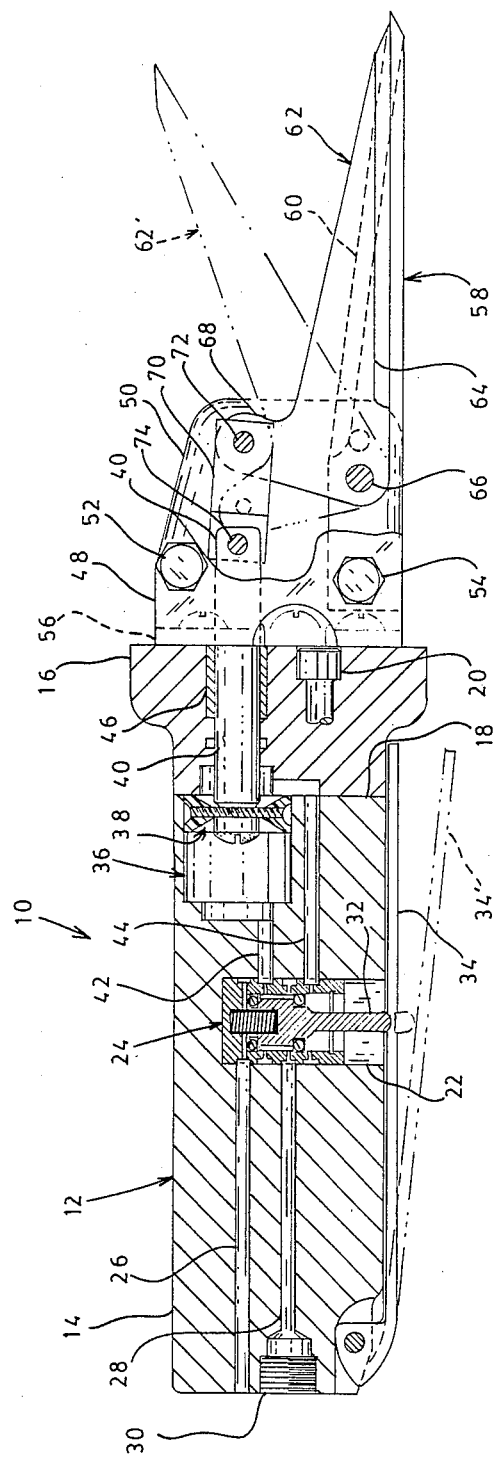
FIG. 1 is a side view, largely cut away, of a shears unit in accordance with the present invention.
Figure 2:
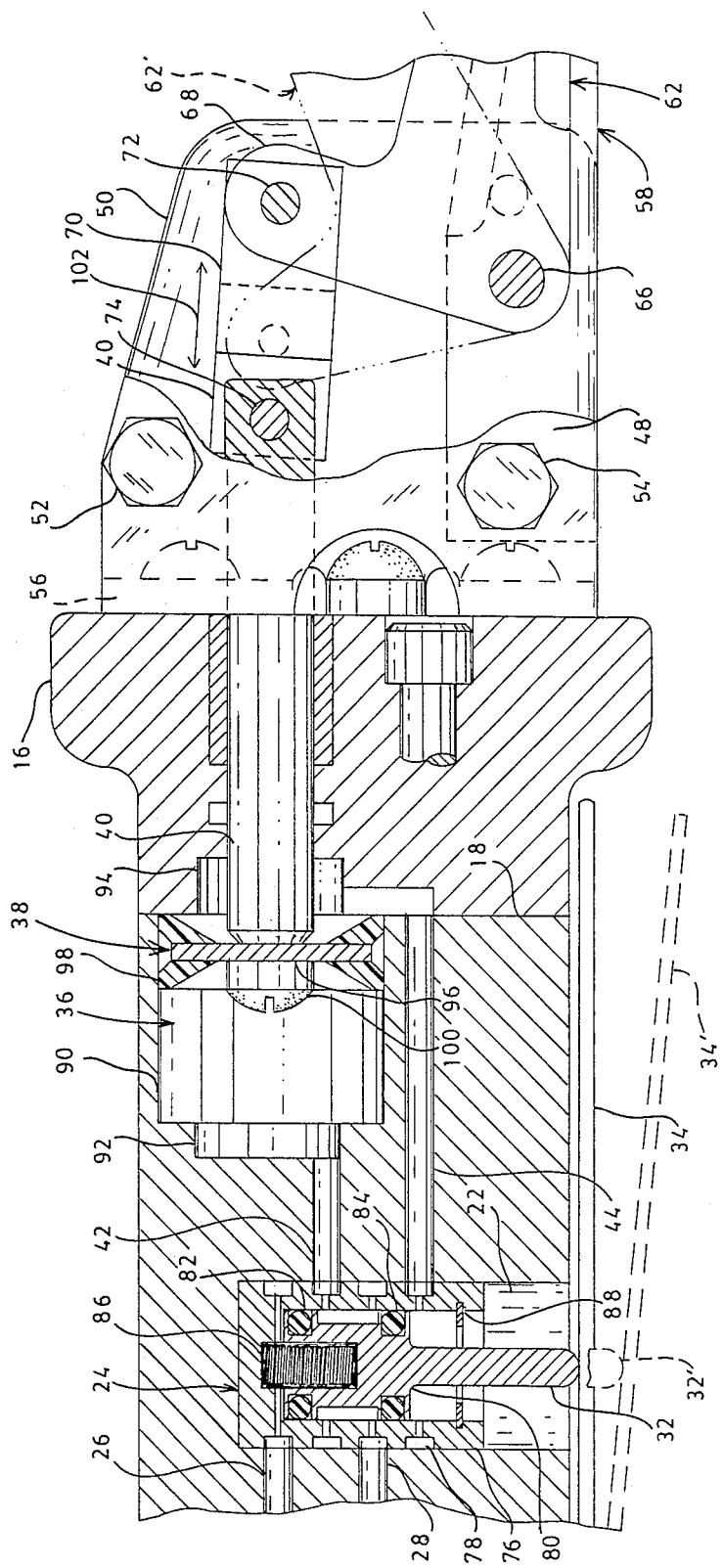
FIG. 2 is an enlarged longitudinal cross-section of a central portion of the shears unit of FIG. 1.
Figure 3:
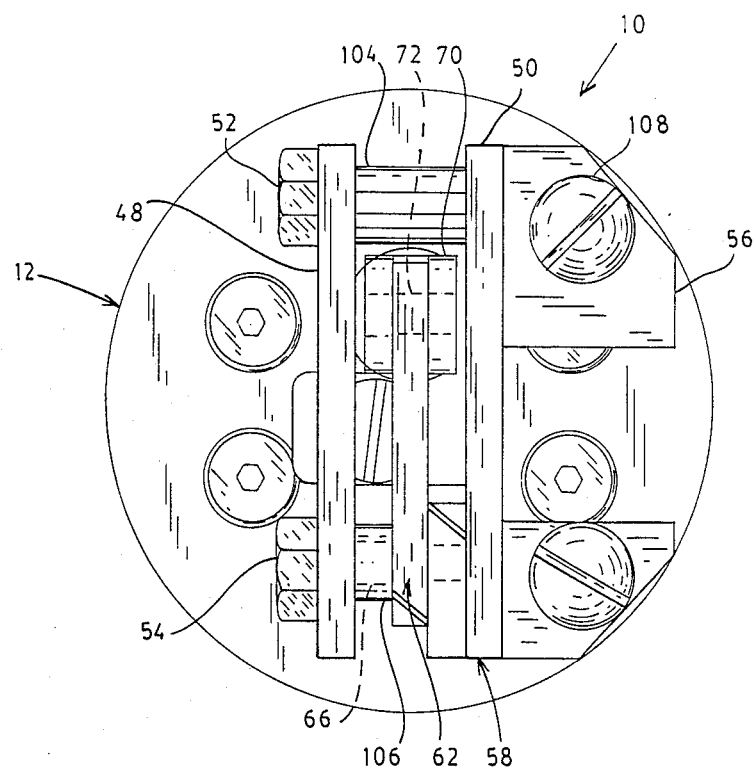
FIG. 3 is an enlarged end view of the shears unit of FIG. 1.

Shown generally at 10 in FIGS. 1-3 is a shears unit as designed to meet the above-recited objects. As discussed hereinafter, it is powered hydraulically using a non-compressible fluid. However, the unit would also function with pneumatic pressure for some operations.

Referring to FIG. 1, a side view of the shears unit 10 is shown with a major portion thereof cut-away in order to illustrate the interior thereof. A body member 12 consists, in this embodiment, of a rearward portion 14 and a forward portion 16. These portions are formed of any suitable light material, such as light metal alloys or machinable plastics. Typically, the body portions 14, 16 can be fabricated from Deldrin. These body portions are typically joined at the interface 18 through the use of bolts as illustrated at 20. Formed in the rearward portion, as by machining, are several cavities. One of these cavities 22 is provided to receive a master valve unit 24. Cavity 22 has an axis substantially perpendicular to the axis of the body member. Leading to this cavity 22, from the exterior of the body 12, are a pair of passageways 26, 28. Passageway 28 is typically provided with a threaded inlet 30 so as to accept a hose or other connection to admit hydraulic fluid into the body 12. Passageway 26 serves as an atmospheric vent line. While details of the master valve will be given in a description of FIG. 2, it will be noted that the master valve has a projecting stem extension 32 which bears against an operating pivotal lever 34. This lever 34 is shown in both an operating position in solid lines, and in phantom lines at 34' in a non-operating position. It will also be understood that the lever 34 is illustrative of one suitable means for actuating the master valve and other means can be utilized if desired.

The rearward handle portion has a second cavity at 36 at the interface 18. This cavity, having an axis substantially parallel with the axis of the body member, serves as a cylinder for a piston 38 attached to a first end of a blade operating piston rod 40. A portion of this cavity 36 in this embodiment extends into the forward body portion 16. A pair of passageways 42, 44 join the cavity 36 with the cavity 22 for purposes described below. A bushing 46 is provided in the forward body portion 16 for guidance of the piston rod 40.

Mounted from the forward body portion 16 are a pair of blade support plates 48, 50. These are connected to each other as by bolts 52, 54, and are supported from the forward body portion with a bracket 56. As will be seen in FIG. 3, the plates 48, 50 are maintained at a selected spacing with bushings. A fixed cutting blade 58, with a cutting edge indicated at 60, is attached to one of the support plates (e.g. plate 50). A movable (i.e., pivotal) blade 62 has a cutting edge indicated at 64. This pivotal blade is provided with a pivot 66 which can be similar to one of the bolts connecting the support plates 48, 50. Also, the pivotal blade has an off-set portion 68. This off-set portion is pivotally attached to one end of a yoke member 70 as at 72. A further end of the yoke member is, in turn, pivotally attached at 74 to a further end of the piston rod 40. Thus, as the piston rod 40 is extended forward (as shown), the pivotal blade 62 is caused to be moved to the position shown in solid lines. However, when the piston rod 40 is withdrawn toward the forward body portion, the pivotal blade 62 moves to the position indicated in phantom lines at 62'.

A better understanding of the operation briefly described above can be had by referring to FIG. 2 wherein the operating components are enlarged to approximately twice their actual size. Referring specifically to the master valve 24, this valve has a body portion 76 that is provided with a plurality of exterior annular recesses as indicated at 78. These recesses are arranged so as to have each of the passageways 26, 28, 42 and 44 communicate with one annular recess as shown. The valve 24 has a valve stem 80 adapted for axial reciprocation within the valve body 76, and annular sealing means (e.g., "O" rings) 82, 84 seal between the valve stem 80 and the body 76. The valve stem is shown in its "valve open" position; however, it is normally biased to a "valve closed" position by a spring means 86. When in the closed position, the stem extension 32 is in the position indicated at 32'. The valve stem 80 is retained in the body 76 as with a split ring 88.

The cavity 36, has, in actuality, three portions: a central cylinder 90 for the movement of the piston 38; a rearward cavity extension 92; and a forward extension 94. The piston, typically, has a central disk 96 surrounded by a semi-flexible sealing member 98. This type of piston is referred to as a "double-acting piston cup" and is typically manufactured by Chicago-Allis, Inc. It is secured to the first end of the piston rod 40 as with a bolt 100.

With regard to the operations of these portions described as being shown in FIG. 2, it will be understood that the hydraulic pressure is applied to the shears unit in passageway 28. With the lever in the "open" position as indicated at 34', the valve stem 80 is positioned so that passageway 28 communicates with passageway 44. Thus, hydraulic pressure is applied to the forward cavity portion 94 and therefore to the forward face of the piston 38 causing the piston 38 to be forced rearwardly. During this rearward movement, the space behind the piston (cavity portions 90 and 92) is vented to the atmosphere through passageway 26. As the piston is moved rearwardly, the piston rod 40 is also moved rearwardly.

When the lever is moved to position 34, the valve stem 80 is moved upwardly. When sufficiently moved, the input passageway 28 no longer is in communication with passageway 44 but is in communication with passageway 42. This applies hydraulic pressure to the cavities 92 and 90 causing the piston 38 to move forwardly. During this movement, the cavity 94 is vented to the atmosphere through passageway 44 and the cavity 22.

As described above, a further end of the piston rod 40 is pivotally attached to a yoke 70 at pivot pin 74. Thus, as the piston rod reciprocates under the action of the piston 38, the yoke also reciprocates in the direction indicated by the arrow 102. Attached at a further end of the yoke, as with the pivot pin 72, is the off-set portion 68 of the pivotal blade 62. Since this blade 62 is pivoted at the fixed pivot 66, reciprocation of the piston rod and yoke causes pivoting of the blade 62 between a cutting position shown in the solid lines and the open position shown with the phantom lines 62'. Since the second blade 58 is fixed in position, the motion produces a cutting action between the blades as the blade 62 approaches the blade 58, with such cutting stroke occurring with each action of the lever 34.

An end view of the present shears unit is shown enlarged in FIG. 3. As described above, the support plates 48, 50 are spaced apart a selected distance by bushings as indicated at 104, 106, and are connected by bolts 52, 54. The aforementioned bracket 56 is attached to the forward handle portion 16 as with a plurality of bolts, such as that indicated at 108. The yoke 70 embraces opposite surfaces of the further end of the piston rod 40, and the pivotal blade 62 is pivotally connected to the yoke with the pivot pin 72. This figure also depicts the pivot pin 66 about which the pivotal blade 62 is pivoted.

Figure 4:
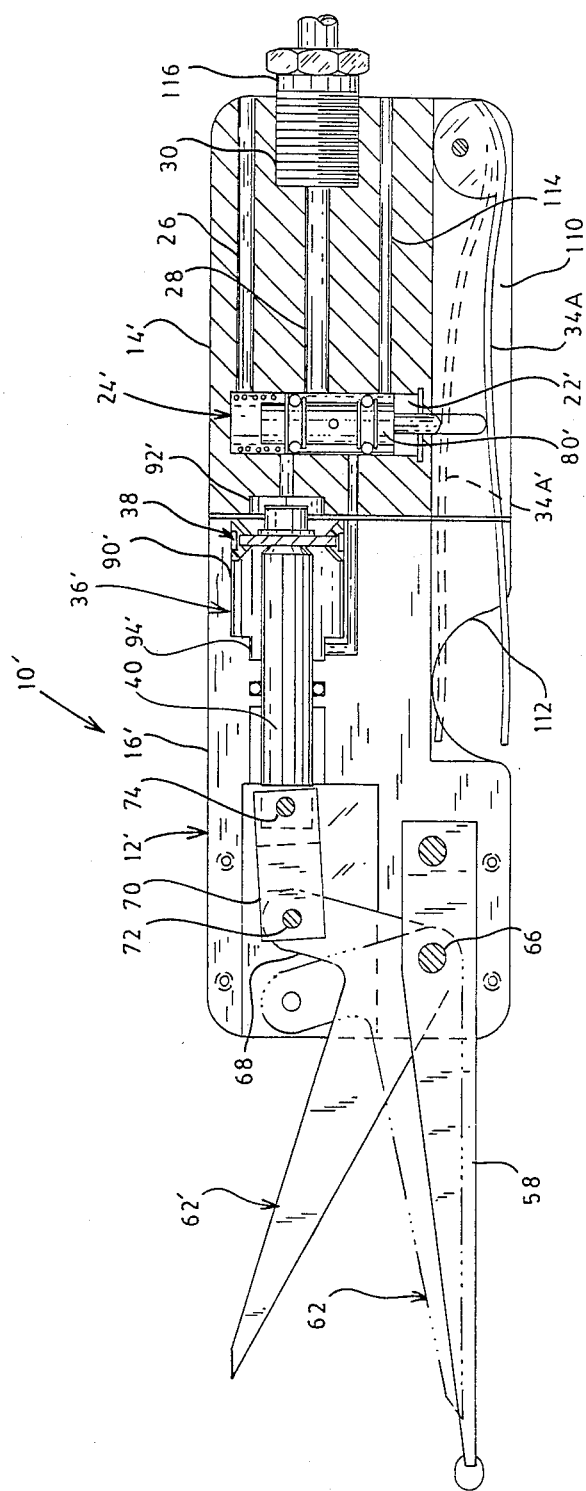
FIG. 4 is a longitudinal cross-sectional view of another embodiment of a shears unit which incorporates substantially the same features as the unit illustrated in FIG. 1.

Another embodiment of the present invention is shown at 10' in FIG. 4. This embodiment utilizes the same mechanisms for operation of the pivotal blade. All items that are the same as the embodiment in FIGS. 1-3 are identified with the same numerals, and items performing the same function but constructed in a different manner are identified with primed numbers (except when the primed numbers are used for phantom positions). Also, as in FIGS. 1 and 2, movable items are shown in solid lines in the "at rest" position, and in phantom lines in their "operated" position.

In this embodiment 10', the body member 12' is made up of a rearward portion 14' and a forward portion 16'. This forward portion 16' extends sufficiently forward so as to substitute for the support plates 48, 50 of the embodiment of FIG. 1. Accordingly, as shown in this FIG. 4, the forward body portion 16' is divided, at a vertical midplane, into a right portion (shown) and left portion (not shown). In this embodiment, the cylinder 36, in which the piston 38 moves, is primarily in the forward body portion 16'. The connection of the piston rod 40 to the pivotal blade 62 utilizes, as in the other embodiment, a pivot member 66 and a pivotal attachment at 72 to a yoke 70, with the yoke pivotally attached at 74 to the end of the piston rod 40.

The lever 34A (designated as such to differentiate due to shape) operates within a recess 110 that is formed in both the rearward body portion 14' and the forward body portion 16'. It is designed to be operated with a finger of a user; therefore, the sides of the recess 110 are cut away as at 112. Since this embodiment is intended to be fabricated from metal, the master valve 24' does not require a separate valve body. Thus, the valve stem 80' reciprocates within the cavity 22'. Although the cavity region below the valve stem could vent around the valve stem extension 32', a second vent line 114 is provided. This FIG. 4 also illustrates a pneumatic/hydraulic hose attached through a coupling 116 threaded into the threaded receptor 30.

In view of the structure and operation of the shears unit depicted in the figures, shears operation are accomplished with very little effort by an operator. This shears operation provides sufficient force for the dissection of, for example, poultry in poultry processing plants. Due to the light weight and low operating effort, a significant reduction in fatigue of an operator is achieved. As one result, a lowering of fatigue lowers the potential for accidents. More precision cutting can be accomplished since the blade only operates each time the lever is operated. The cutting components (the blades) are easily removed for sharpening or replacement, and the unit is easily cleaned to prevent the spread of bacteria, etc.

From the foregoing, it will be understood by one versed in the art that a practical and convenient shears unit is provided. This shears unit is of particular value in the processing of poultry; however, other applications will be readily envisioned for the present shears unit. Although specific illustrations are given as to components, these are not given as a limitation of the invention. Rather, the invention is to be limited only by the appended claims and their equivalents when read with reference to the full description.

I claim:

1. A hand-held, fluid-operated shears unit for providing substantial cutting force without undue force being applied by a user of said shears unit, which comprises:
    an elongated body member, said body member having a rearward portion including a rearward end, and a forward portion including a forward end, said body member provided with an internal cylindrical surface defining a cylinder for receiving a reciprocatable piston, said cylinder provided with a forward port and a rearward port;
    a pair of support plates carried by said forward end;
    a first blade attached to at least one of said support plates, and a second blade pivotally attached to at least one of said support plates, said second blade positioned on a pivot member to cooperate with said first blade to provide a cutting action when said second blade is pivoted toward said first blade;
    a piston slidably positioned within said cylinder of said body member for reciprocation between a forward position and a rearward position;
    a piston rod, said forward body portion provided with a channel to slidably receive said piston rod, said piston rod having a rearward end attached to said piston, and a forward end extending from said forward end of said forward body portion;
    linkage means for pivotally attaching said forward end of said piston rod to said second blade whereby reciprocation of said piston rod within said channel causes said second blade to pivot with respect to said first blade;
    a master valve mounted within said body member, said master valve having a plurality of ports and a slidable valve stem, one of said valve ports being in communication with said forward port of said cylinder, a second of said valve ports being in communication with said rearward port of said cylinder, a third of said valve ports being in communication with a source of pressurized fluid, and a forth of said valve ports being in communication with a vent from said body member; and
    master valve actuating means for selectively moving said valve stem thereby causing said source of pressurized fluid to be in communication, through said second and third valve ports, to said rearward port of said cylinder whereby said second blade is pivotally moved into engagement with said first blade to effect cutting action therebetween.

2. A hand-held, fluid-operated shears unit for providing substantial cutting force without undue force being applied by a user of said shears unit, which comprises:
    an elongated body member with an axis, said body member having a rearward portion including a rearward end, and a forward portion including a forward end, said body member provided with an internal cylindrical surface defining a cylinder for receiving a reciprocatable piston, said cylinder having an axis parallel to said axis of said body member, said cylinder provided with a forward port and a rearward port;
    a pair of spaced-apart support plates carried by said forward end, said support plates extending in a direction parallel to said axis;
    a first blade releasably attached to at least one of said support plates, said first blade extending in a direction substantially parallel to said axis;
    a second blade pivotally and releasably attached to at least one of said support plates, said second blade positioned on a pivot member to cooperate with said first blade to provide a cutting action when said second blade is pivoted toward said first blade;
    a piston slidably positioned within said cylinder of said body member for reciprocation between a forward position and a rearward position;
    a piston rod having an axis parallel with said body member axis, said forward body portion provided with a channel to slidably receive said piston rod, said piston rod having a rearward end attached to said piston, and a forward end extending from said forward end of said forward body portion;
    linkage means having a first end and a further end, said first end pivotally attached to said forward end of said piston rod, and said further end pivotally attached to said second blade whereby reciprocation of said piston rod within said channel causes said second blade to pivot with respect to said first blade;
    a master valve mounted within said body member and oriented substantially perpendicular to said body axis, said master valve having a plurality of ports and an axially slidable valve stem, said valve stem having an extension projecting exterior to said body member, one of said valve ports being in communication with said forward port of said cylinder, a second of said valve ports being in communication with said rearward port of said cylinder, a third of said valve ports being in communication with a source of pressurized fluid, and a forth of said valve ports being in communication with a vent from said body member;
    a spring member associated with said master valve for normally biasing said valve stem to a position whereby said source of pressurized fluid is in communication through said first and third valve ports to said forward port of said cylinder whereby said second blade is pivoted away from said first blade; and
    lever means having a first end pivotally attached to said body member, and a second end, said lever member engaged with said exposed end of said valve stem extension whereby when said lever means is moved toward said body member by said user, said lever member moves said valve stem against said spring thereby causing said source of pressurized fluid to be in communication, through said second and third valve ports, to said rearward port of said cylinder whereby said second blade is pivotally moved into engagement with said first blade to effect cutting action therebetween.

3. The shears unit of claim 2 wherein said pressurized fluid is a liquid.

4. The shears unit of claim 2 wherein said forward body portion and rearward body portion are separate units and are releasably fastened by bolt means to form the body member.

5. The shears unit of claim 4 wherein said rearward body member is provided with a cylindrical valve cavity having an axis perpendicular to said body axis, wherein said master valve is slidably received in said valve cavity of said rearward body member and wherein said master valve has a valve body to slidably receive said valve stem, said valve body being provided with said valve ports.

6. The shears unit of claim 2 wherein said body member is substantially circular in cross-section of a size for easy grasp by said user of said shears unit, and said body member is fabricated from a machinable plastic.

7. The shears unit of claim 2 wherein said first end of said lever is pivotally attached to said body member proximate said rearward end, said second end of said lever projecting toward said forward body portion.

8. The shears unit of claim 7 wherein said lever means is received in a recess in said body member, said recess formed by side walls, said side walls provided with notches to receive at least one finger of said user as said lever means is pivoted against said valve stem extension by said user.

9. The shears unit of claim 4 wherein said forward body portion is divided into confronting side portions and said side portions are joined with bolt means.

10. The shear unit of claim 9 wherein said support plates are integral with said side portions of said forward body portion.

11. The shear unit of claim 2 wherein said linkage means is a yoke member having a pair of arms embracing and pivotally connected to said second end of said piston rod and at least one arm pivotally connected to said second blade.

12. A hand-held, hydraulically-operated shears unit for use in the processing of poultry, said shears unit providing substantial cutting force without undue force being applied by a user of said shears unit, which comprises:
an elongated substantially cylindrical body member with an axis, said body member having a rearward portion including a rearward end, and a forward portion including a forward end, said body member provided with an internal cylindrical surface defining a cylinder for receiving a reciprocatable piston, said cylinder having an axis parallel to said axis of said body member, said cylinder provided with a forward port and a rearward port;
a bracket member fastened to said forward end of said body member;
a pair of spaced-apart support plates carried by said bracket, said support plates extending in a direction parallel to said axis;
a first blade releasably attached to at least one of said support plates, said first blade extending in a direction substantially parallel to said axis;
a second blade pivotally and releasably attached to at least one of said support plates, said second blade positioned on a pivot member to cooperate with said first blade to provide a cutting action when said second blade is pivoted toward said first blade;
a double-acting piston cup slidably positioned within said cylinder of said body member for reciprocation between a forward position and a rearward position;
a piston rod having an axis parallel with said body member axis, said forward body portion provided with a channel to slidably receive said piston rod, said piston rod having a rearward end attached to said piston, and a forward end extending from said forward end of said forward body portion;
linkage means having a first end and a further end, said first end having a pair of legs pivotally attached to said forward end of said piston rod, and said further end pivotally attached to said second blade whereby reciprocation of said piston rod within said channel causes said second blade to pivot with respect to said first blade;
a master valve mounted within said body member and oriented substantially perpendicular to said body axis, said master valve having a plurality of ports and an axially slidable valve stem, said valve stem having an extension projecting exterior to said body member, one of said valve ports being in communication with said forward port of said cylinder, a second of said valve ports being in communication with said rearward port of said cylinder, a third of said valve ports being in communication with a source of pressurized fluid, and a forth of said valve ports being in communication with a vent from said body member;
a spring member associated with said master valve for normally biasing said valve stem to a position whereby said source of pressurized fluid is in communication through said first and third valve ports to said forward port of said cylinder whereby said second blade is pivoted away from said first blade; and
lever means having a first end pivotally attached to said body member, and a second end, said lever member engaged with said exposed end of said valve stem extension whereby when said lever means is moved toward said body member by said user, said lever member moves said valve stem against said spring thereby causing said source of pressurized fluid to be in communication, through said second and third valve ports, to said rearward port of said cylinder whereby said second blade is pivotally moved into engagement with said first blade to effect cutting action therebetween.

13. The shears unit of claim 12 wherein said forward body portion and rearward body portion are separate units and are releasably fastened by bolt means to form the body member.

14. The shears unit of claim 12 wherein said rearward body member is provided with a cylindrical valve cavity having an axis perpendicular to said body axis, wherein said master valve is slidably received in said valve cavity of said rearward body member and wherein said master valve has a valve body to slidably receive said valve stem, said valve body being provided with said valve ports.

15. The shears unit of claim 12 wherein said first end of said lever is pivotally attached to said body member proximate said rearward end, said second end of said lever projecting toward said forward body portion.

* * * * *